(12) United States Patent
Tomiyoshi

(10) Patent No.: US 8,269,918 B2
(45) Date of Patent: Sep. 18, 2012

(54) LIGHT SOURCE WITH OVERLAPPING LIGHT GUIDE ELEMENTS FOR LIQUID CRYSTAL DISPLAY DEVICE

(75) Inventor: Akira Tomiyoshi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 776 days.

(21) Appl. No.: 12/375,240

(22) PCT Filed: Jun. 22, 2007

(86) PCT No.: PCT/JP2007/062628
§ 371 (c)(1),
(2), (4) Date: Jan. 27, 2009

(87) PCT Pub. No.: WO2008/050509
PCT Pub. Date: May 2, 2008

(65) Prior Publication Data
US 2009/0316074 A1 Dec. 24, 2009

(30) Foreign Application Priority Data
Oct. 27, 2006 (JP) .................................. 2006-293239

(51) Int. Cl.
*G02F 1/1335* (2006.01)
*F21V 7/04* (2006.01)

(52) U.S. Cl. .............. 349/65; 349/61; 349/62; 362/616; 362/632

(58) Field of Classification Search ............. 349/65, 349/61, 62; 362/616, 632
See application file for complete search history.

(56) References Cited

U.S. PATENT DOCUMENTS

| 6,241,358 B1 | 6/2001 | Higuchi et al. | |
| 6,580,477 B1 | 6/2003 | Cho | |
| 2002/0125815 A1 | 9/2002 | Wakita | |
| 2003/0063456 A1 | 4/2003 | Katahira | |
| 2003/0206253 A1* | 11/2003 | Cho ................................ 349/61 |
| 2005/0128374 A1* | 6/2005 | Furukawa ........................ 349/56 |
| 2006/0125979 A1 | 6/2006 | Fang et al. | |
| 2007/0247869 A1 | 10/2007 | Lang et al. | |

FOREIGN PATENT DOCUMENTS

| CN | 01122554.8 | * | 7/2001 |
| CN | 1393729 A | | 1/2003 |

(Continued)

OTHER PUBLICATIONS

Supplementary EP Search Report mailed Oct. 29, 2010 in EP application 07767437.2.

(Continued)

*Primary Examiner* — Lauren Nguyen
(74) *Attorney, Agent, or Firm* — Nixon & Vanderhye P.C.

(57) ABSTRACT

A light source device having light guide elements (2a to 2f) and light emitting elements (3a to 3f) for supplying light to each of the light guide elements. The light guide elements each has a wedge-like shape whose thickness is reduced from one end to the other end. The light guide elements are tandem arranged such that the thinner end of a light guide element lies over the thicker end of the other light guide element. Each light guide element has holding sections recessed in the width direction (8a to 8f, 9a to 9f) in its thicker end on which the other light guide element lies. In the light guide device in which the wedge shaped light guide elements are tandem arranged, positional displacement between light guide elements is prevented.

9 Claims, 19 Drawing Sheets

FOREIGN PATENT DOCUMENTS

| | | |
|---|---|---|
| JP | 9-114393 A | 5/1997 |
| JP | 09-186825 | 7/1997 |
| JP | 11-288611 A | 10/1999 |
| JP | 2001-075096 A | 3/2001 |
| JP | 2002-328623 A | 11/2002 |
| JP | 2003-215577 A | 7/2003 |
| JP | 2004-213948 | 7/2004 |
| JP | 2006-134748 | 5/2006 |
| JP | 2008-500739 A | 1/2008 |
| WO | 2005/114273 A1 | 12/2005 |

OTHER PUBLICATIONS

International Search Report for PCT/JP2007/063439, mailed Jul. 24, 2007.

International Search Report for PCT/JP2007/062628, mailed Jul. 24, 2007.

* cited by examiner

LIGHT SOURCE WITH OVERLAPPING LIGHT GUIDE ELEMENTS FOR LIQUID CRYSTAL DISPLAY DEVICE This application is the U.S. national phase of International Application No. PCT/JP2007/062628, filed 22 Jun. 2007, which designated the U.S. and claims priority to Japanese Patent Application No. 2006-293239, filed 27 Oct. 2006, the entire contents of each of which are hereby incorporated by reference.

TECHNICAL FIELD

The present invention relates to a light source device used in a liquid crystal display device and the like.

BACKGROUND ART

As one of light source devices used in a backlight of a liquid crystal display device, etc., a surface illuminant which comprises light emitting elements and light guide elements is known. Further, Patent Document 1 for instance discloses an art for enlarging a surface illuminant of this configuration. The art is that wedge shaped light guide elements are tandem arranged and each of the light guide elements is provided with a light emitting element such as a cold cathode fluorescent lamp. This art is illustrated in FIGS. 20 to 22.

As shown in FIG. 20, a light source device 101 has primary light sources (cold cathode fluorescent lamps) L1, L2 and first and second light guide blocks BL1, BL2. The first and second light guide blocks BL1, BL2 are tandem arranged in supply direction of the primary light. A double-faced prism sheet (not illustrated) is provided on emitting surfaces 115, 125 respectively. One end face of each light guide block BL1 and BL2 is referred to as a light entrance face 112 (122) from which primary light supplied from the primary light source L1 (L2) enters.

The light guide block BL1 (BL2) is reduced in thickness from the light entrance face 112 (122) to an apical end 117 (127). A recess is made hereby behind the apical end 117 of the light guide block BL1. The recess is used for providing the second primary light source L2 which supplies the primary light to the light guide block BL2. The first primary light source L1 is provided along the light entrance face 112.

As shown in FIG. 21, the tandem arranged light guide blocks BL1, BL2 the prime light sources L1, L2, and the prism sheets (not illustrated) are contained in a housing (case) 150 as an assembly. The housing 150 contains mounting sections for primary light sources 151, 152, and mounting sections for light guide blocks 153, 154 in a rectangular frame 155. The mounting sections for primary light sources 151, 152 have slopes corresponding with the slant of rear faces 116, 126 of the light guide blocks BL1, BL2. The slopes serve as reflection surface. Further, fixing claws 156 are provided on the inner walls E1, E2 (in tandem (y) direction) of the flame 155. The fixing claws 156 are used for fixedly holding the light guide blocks BL1, BL2 in the housing 150.

In the light source device, the light from the primary light source L1 enters into the light guide block BL1. The light, while being scattered and reflected, is guided to the apical end 117 toward which the light guide block BL1 becomes thinner. In this step, illumination light is gradually emitted from the emitting surface 115 preferentially in a diagonally forward direction. The light emitted diagonally forward is directionally corrected to a two-dimensionally frontward direction by the double-faced prism sheet. There is a reflective element between the first light guide block BL1 and the second primary light source L2 (not illustrated). The reflective element prevents a direct light supply from the primary light source L2 to the light guide block BL1.

[Patent Document 1] Japanese Unexamined Patent Application Publication, Tokukaihei, No. 11-288611 (published on Oct. 19, 1999)

DISCLOSURE OF INVENTION

In the configuration of FIGS. 20 and 21, each light guide block is held in the frame 155 by the fixing claws 156 provided on the inner walls E1, E2 in y direction. As shown in FIG. 22, in case light guide blocks BL1 to BL6 are arranged in a matrix of 2×3, the light guide blocks BL2 and BL5 get easily out of alignment in their width direction (x direction in the figure) because those light guide blocks are not fixedly held. Even if claws are provided on inner walls E3, E4 in x direction, the same problem occurs. Moreover, it is also a problem that a positioning of each light guide block in an assembling process is difficult to be performed.

When positional relations between each of light guide blocks become uneven, gaps between the light guide blocks also become different. This leads to optical unevenness of the light source device (surface illuminant).

The present invention is accomplished in consideration of the aforementioned problems. An object of the invention is to provide configurations that can prevent positional displacement of each light guide element in a light source device having wedge shaped light guide elements which are tandem arranged.

A light source device of the present invention comprises: light guide elements; light emitting elements for supplying light to each of the light guide elements, wherein the light guide elements each has a wedge-like shape whose thickness is reduced from one end to the other end; the light guide elements are tandem arranged such that the thinner end of a light guide element lies over the thicker end of the other light guide element; and the light guide elements each has holding sections recessed in a width direction in its thicker end on which the other light guide element lies.

In the configuration, the holding sections recessed in each light guide element do not affect light emitting quantity of the light guide element because the recesses are provided in a section on which the other light guide element lies. That is, in the configuration, the holding sections may be fitted with protrusions on such as a housing, and thereby positional displacement or a jouncing of the light guide elements can be prevented without affecting light emission of the light guide elements. Moreover, optical unevenness of a surface illuminant can be reduced thereby. Further, positioning of each light guide element in such as the housing can be performed easily.

The present light source device may have a housing that contains the light emitting elements and the light guide elements, the housing may have protrusions fitted with the holding sections. In this case, the protrusions are preferably optical transparent or light reflective. Light utilization efficiency can be improved thereby because light absorption by the protrusions does not occur.

In the present light source device, the protrusions may be formed of ribs (holding ribs) that abut the side face of the thicker end. Moreover, the protrusions may be formed of hooks (holding hooks) that abut the front face and the side face of the thicker end.

The present light source device comprises: light guide elements; light emitting elements for supplying light to each of the light guide elements, wherein: the light guide elements each has a wedge-like shape whose thickness is reduced from one end to the other end; the light guide elements are tandem arranged such that the thinner end of a light guide element lies over the thicker end of the other light guide element; and the light guide elements each includes a holding part on its thicker end on which the other light guide element lies.

In the configuration, the holding part on each light guide element does not affect light emitting quantity of the light guide element because the part is provided in the section on which the other light guide element lies. In the configuration, the holding part may be fitted with such as a housing, and thereby positional displacement or a jouncing of the light guide elements can be prevented without affecting light emission of the light guide elements. Moreover, the optical unevenness of a surface illuminant can be reduced thereby. Further, positioning of each light guide element in such as the housing can be performed easily.

In the present light source device, the holding part may be a protrusion on the rear face of the thicker end. In this case, a housing that contains the light emitting elements and the light guide elements may be provided. The housing may have recesses fitted with the protrusions. Moreover, the protrusions are preferably optical transparent or light reflective.

In the present light source device, the holding part may be a protrusion on one side face of the thicker end. The light source device may have lines including light guide elements which are tandem arranged, wherein: the light guide elements each may have a recess on the other side face of the thicker end; and the recess is fitted with a protrusion of an adjacent light guide element.

The present light source device comprises light guide elements; and light emitting elements for supplying light to each of the light guide elements, wherein: the light guide elements each has a wedge-like shape whose thickness is reduced from one end to the other end; the light guide elements are tandem arranged such that the thinner end of a light guide element lies over the thicker end of the other light guide element; and the light guide elements each has a holding hole in a rear face of the thicker end on which the other light guide element lies.

In the configuration, the holding hole in each light guide element does not affect light emitting quantity of the light guide element because the hole is provided in the section on which the other light guide element lies. In the configuration, the holding holes may be fitted with protrusions provided on such as a housing, and thereby positional displacement or a jouncing of the light guide elements can be prevented without affecting light emission of the light guide elements. Moreover, optical unevenness in a surface illuminant can be reduced thereby. Further, positioning of each light guide element in such as the housing can be performed easily.

The present light source device comprises a housing that contains the light emitting elements and the light guide elements, the housing may have protrusions fitted with the recesses.

A light source device of the present invention is suitable for a configuration which comprises a plurality of lines including light guide elements tandem arranged.

In the present light source device, the light guide elements each may have a connecting hole in its front face of thicker end on which the other light guide element lies. In this case, the light guide elements each may have a connecting rib on its rear face of the thinner end which lies on the other light guide element. Tandem adjoined light guide elements can be fixed by fitting the connecting rib with one of the connecting holes.

A light source device of the present invention comprises: light guide elements; light emitting elements for supplying light to each of the light guide elements; and a housing that contains the light emitting elements and the light guide elements, wherein the light guide elements each has a wedge-like shape whose thickness is reduced from one end to the other end; the light guide elements are tandem arranged such that the thinner end of a light guide element lies over the thicker end of the other light guide element; the light guide elements which are tandem arranged are aligned in plural lines along the row direction; the light guide elements each has a recess in row direction in its thicker end being adjacent in row direction; the recesses of the adjacent light guide elements face each other; and the recesses facing each other are fit with a protrusion provided on the housing.

Moreover, a light source device of the present invention comprises: light guide elements; light emitting elements for supplying light to each of the light guide elements; and a housing that contains the light emitting elements and the light guide elements, wherein: the light guide elements each has a wedge-like shape whose thickness is reduced from one end to the other end; the light guide elements are tandem arranged such that the thinner end of a light guide element lies over the thicker end of the other light guide element; the thicker end of each light guide element has a recess on a side, on a reverse side of which the other light guide element lies, the recess is fitted with a protrusion provided on the housing; or, the thicker end of each light guide element has a protrusion, the protrusion is provided on a side, on a reverse side of which the other light guide element lies, the protrusion is fitted in a recess provided in the housing.

A backlight device of the present includes the above light source device. The backlight device is used for such as a liquid crystal display device.

Moreover, a liquid crystal display device of the present invention includes the above backlight device.

As is described above, in the present light source device which comprises light guide elements tandem arranged, each light guide element is fixed with utilizing a section on which the other light guide element lies. Thereby positional displacement or a jouncing of the light guide elements can be prevented without affecting light emission of the light guide elements. Moreover, optical unevenness in a surface illuminant can be reduced thereby. Further, positioning of each light guide element in such as a housing can be performed easily.

EXPLANATION OF REFERENTIAL NUMERALS

Figure 1:
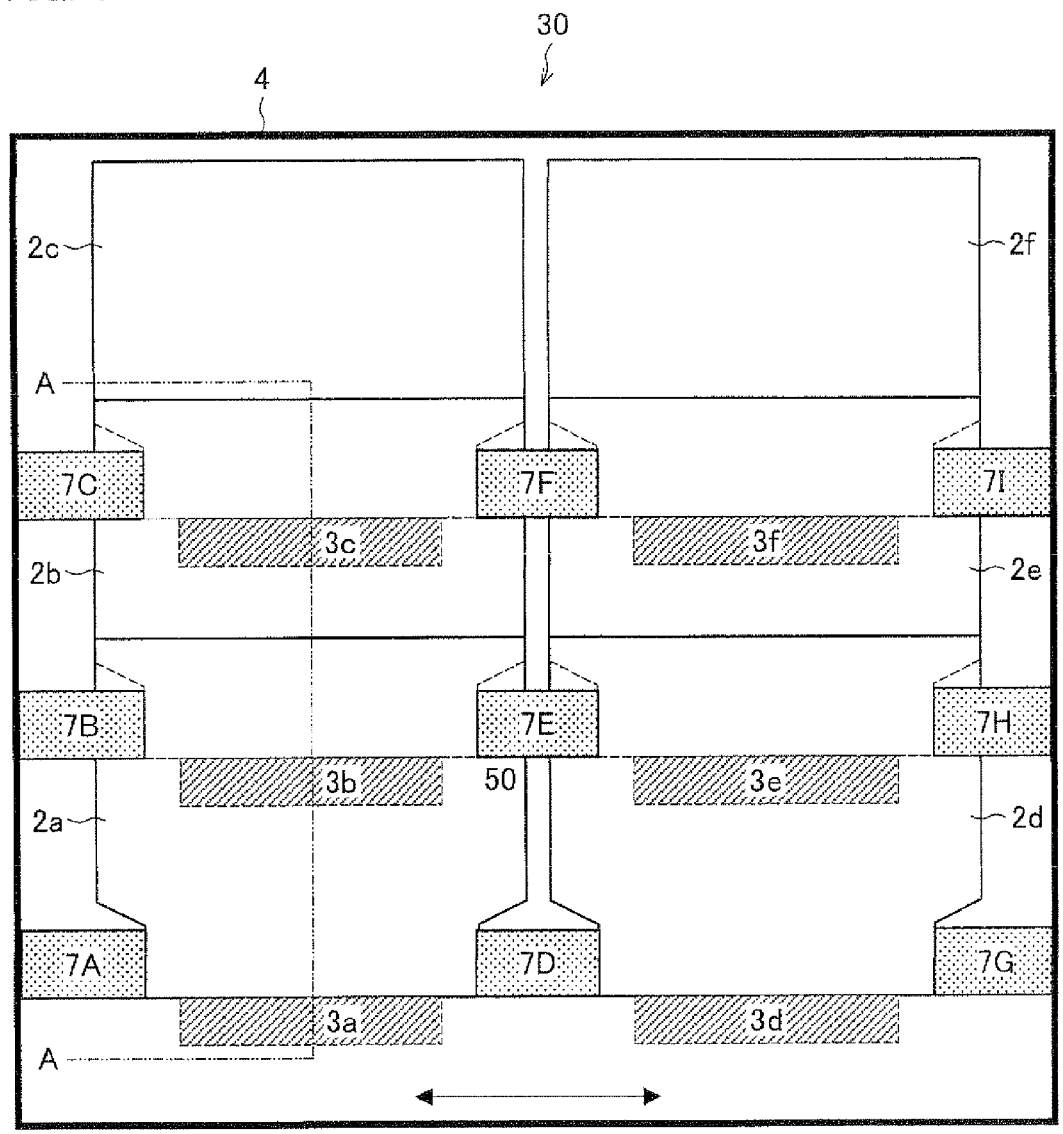
FIG. 1 is a plan view showing a configuration of a backlight device in a first embodiment.

1: Liquid crystal display device
2: Light guide element
3: Light emitting element
7: Rib
8, 9: Holding section
17a to 17f, 18a to 18f: Holding hole
19: Rib
27a to 27f, 28a to 28f: Rib
30, 40, 50, 60: Backlight (light source device)

BEST MODE FOR CARRYING OUT THE INVENTION

One embodiment of the present invention is described below with reference to FIGS. 1 to 19. As shown in FIG. 4, the present liquid crystal display device 1 includes a liquid crystal panel and a backlight device. The backlight device includes light guide elements, light emitting elements for each of the light guide elements, and a housing (case, chassis) (not illustrated).

Figure 2:
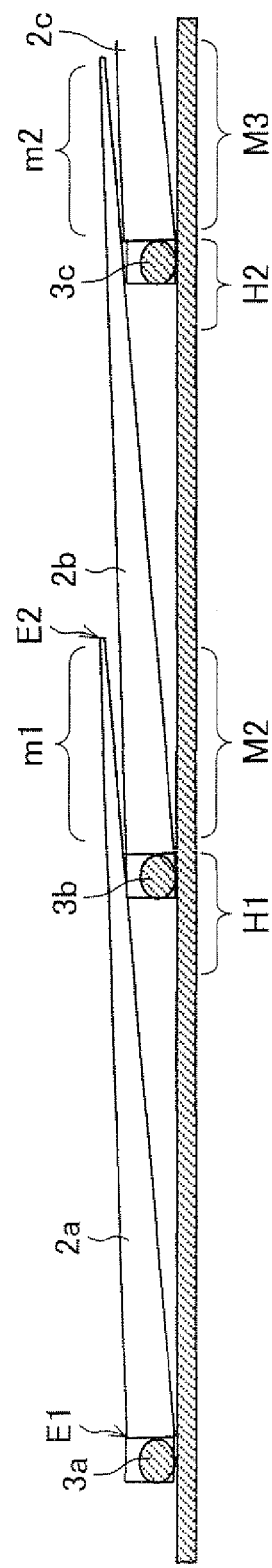
FIG. 2 is a cross-sectional view showing a part of a configuration of a backlight device in the embodiment.

FIG. 2 is a cross-sectional view showing a part of a configuration of the backlight device. As is shown in FIG. 2, in the backlight device, tandem arranged light guide elements 2a to 2c are grouped as one group, and light emitting elements (3a to 3c) are provided for each of the light guide elements (2a to 2c). Here, as shown in FIG. 2, the light guide elements 2 have a wedge-like shape whose thickness is reduced from one end (edge E1) to the other end (edge E2). In each group, the light guide elements are tandem arranged such that the thinner end of a light guide element lies over the thicker end of the other light guide element. In this arrangement, a recess is generated beside the thicker end of a light guide element. A light emitting element for the light guide element is provided in the recess. For instance, a thinner end m1 of a light guide element 2a lies over a thicker end M2 of a light guide element 2b. In the arrangement, a recess H1 is generated and a light emitting element 3b is provided therein. Further, a thinner end m2 of a light guide element 2b lies over a thicker end M3 of a light guide element 2c. In the arrangement, a recess H2 is generated and a light emitting element 3c is provided therein. A light emitting element 3a is provided along a thicker edge E1 of the light guide element 2a.

Figure 3:
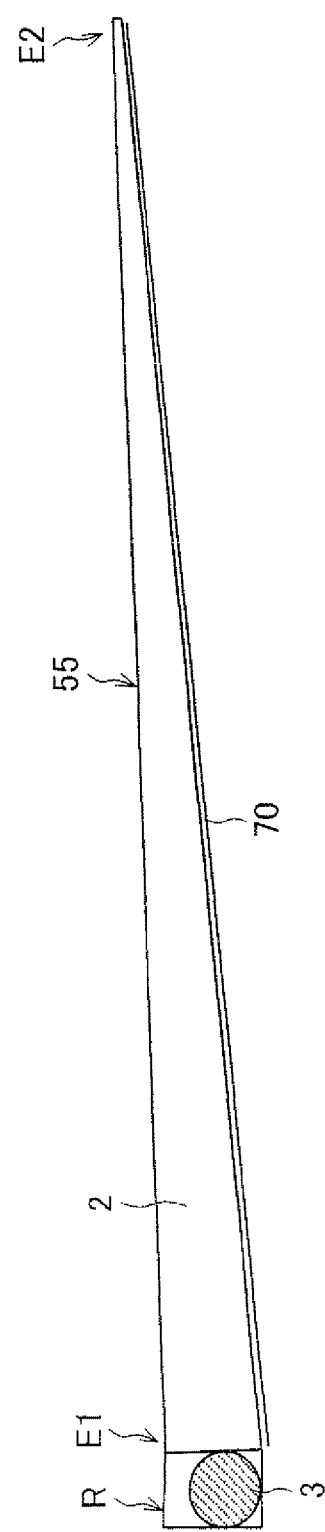
FIG. 3 is a cross-sectional view showing a configuration of a light guide element.
Figure 4:
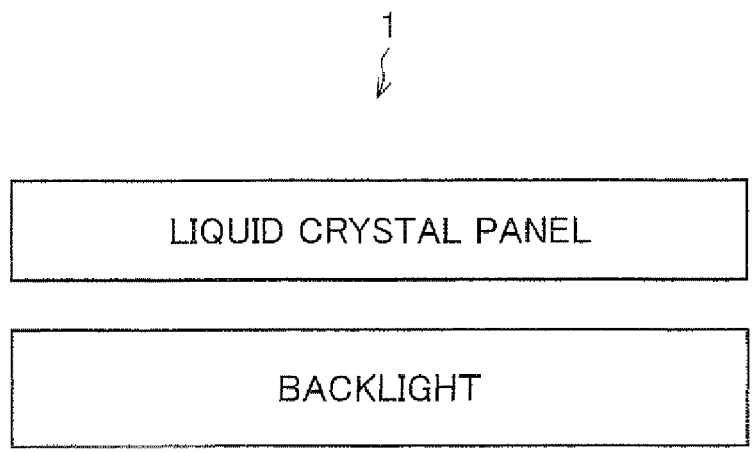
FIG. 4 is a schematic view showing a configuration of a liquid crystal display device of the present invention.

A light guide element 2 is made of acrylic resin or the like) and is provided with a reflection sheet 70 attached on a rear face (backside) thereof, as shown in FIG. 3. A prism sheet may be provided on the front face of the light guide element 2, and further, a diffusion sheet may be provided between the prism sheet and the light guide element 2 (not illustrated). The reflection sheet 70 may be substituted with a reflective plate. Moreover, a housing for holding the light guide element 2 may have a reflection function. Further, a light emitting element 3 is covered with a reflective cover R. With the configuration, light of the light emitting element 3 is, after entering from the thicker end (edge E1) of the light guide element 2, guided to the thinner end (edge E2) while being scattered and reflected. In this step, the light is emitted from a front face 55 of the light guide element, and a surface illuminant is achieved thereby.

[First Embodiment]

FIG. 1 is a plan view showing a configuration of a backlight device in a first embodiment. As shown in FIG. 1, a present backlight device 30 includes light guide elements 2 (2a to 2f), light emitting elements 3 (3a to 3f), and a housing 4 provided with ribs 7 (holding ribs 7A to 7I).

Figure 6:
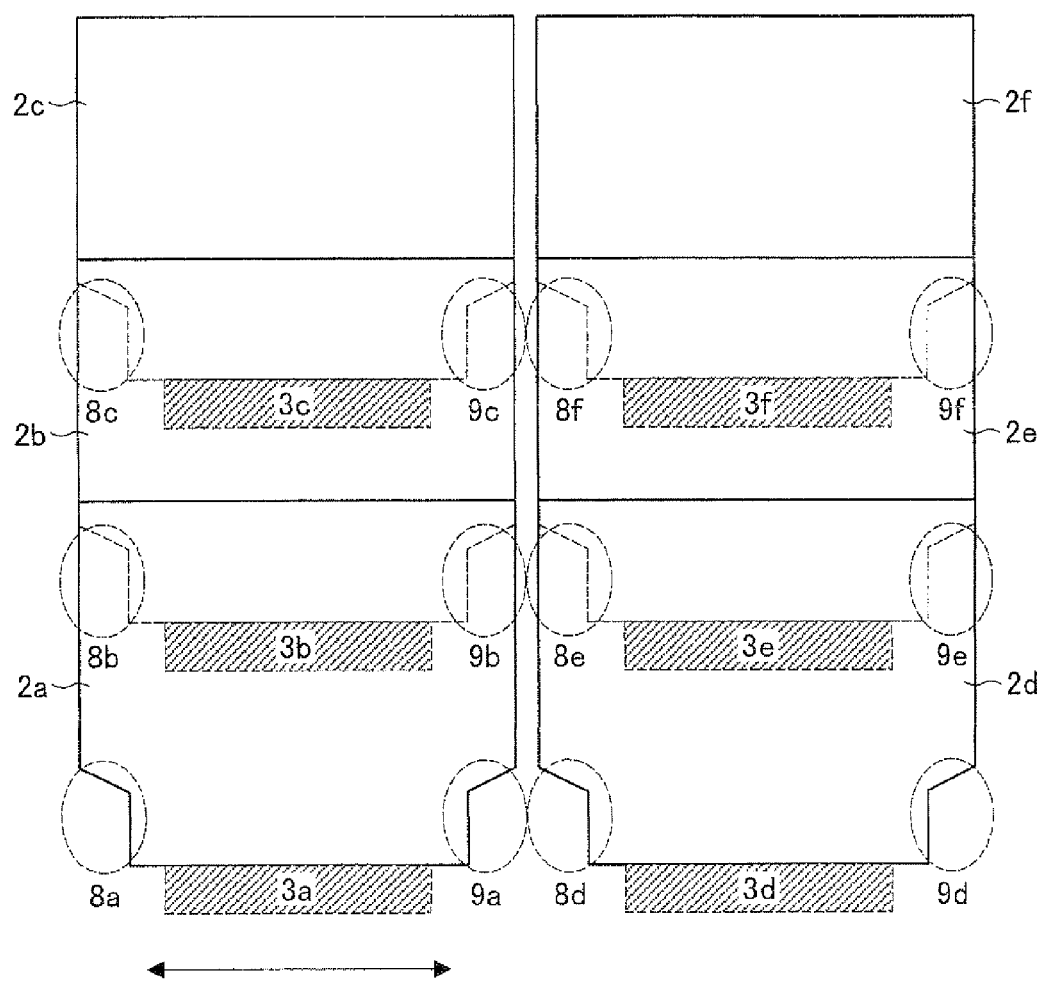
FIG. 6 is a plan view showing an arrangement of light guide elements and light emitting elements in the first embodiment.
Figure 7:
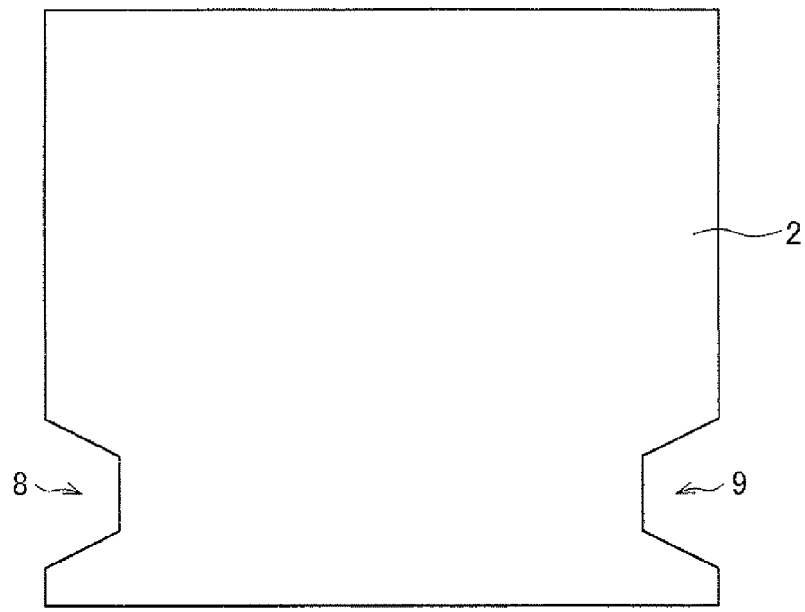
FIG. 7(a) is a plan view showing an example of a modification of a backlight device in the first embodiment.
FIG. 7(b) is a plan view showing another example of a modification of a backlight device in the first embodiment.
Figure 7:
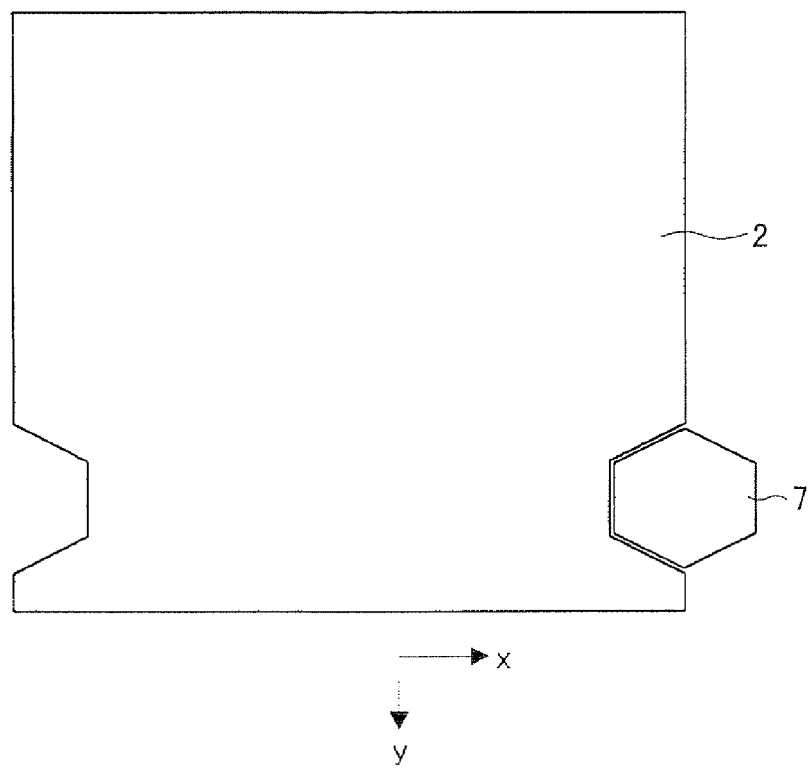

FIG. 6 shows an arrangement of the light guide elements and the light emitting elements in the present backlight device. As shown in FIG. 6, in the backlight device 30, the light guide elements 2a to 2c are tandem arranged in the lengthwise direction in the figure. The light guide elements 2d to 2f are also arranged in the same way. The light guide elements 2a to 2c are grouped as one group, and also the light guide elements 2d to 2f are grouped as one group. The alignment of the light guide elements 2a to 2c is next to that of the light guide elements 2d to 2f in the crosswise direction. Further, light emitting elements (3a to 3f) are provided for each light guide element (2a to 2f), respectively. FIG. 2 is a cross-sectional view taken along line A-A of FIG. 1. As shown in FIG. 2, the light guide element 2 has a wedge-like shape whose thickness is reduced from one end (edge E1) to the other end (Edge E2). In each group, the light guide elements are tandem arranged such that the thinner end m of a light guide element lies over the thicker end M of the other light guide element. In this arrangement, a recess H is generated beside the thicker end of a light guide element. A light emitting element for the light guide element is provided in the recess.

For instance, a thinner end m1 of the light guide element 2a lies over a thicker end M2 of the light guide element 2b. In the arrangement, a recess H1 is generated and the light emitting element 3b is provided therein. Moreover, a thinner end m2 of the light guide element 2b lies over a thicker end M3 of the light guide element 2c. In the arrangement, a recess H2 is generated and the light emitting element 3c is provided therein. The light emitting element 3a is provided along a thicker edge E1 of the light guide element 2a. In the same way, though it is not illustrated, a thinner end of the light guide element 2d lies over a thicker end of the light guide element 2e. In the arrangement, a recess is generated and the light emitting element 3e is provided therein. Moreover, a thinner end of the light guide element 2e lies over a thicker end of the light guide element 2f. In the arrangement, a recess is generated and the light emitting element 3f is provided therein. The light emitting element 3d is provided along a thicker edge (E1) of the light guide element 2d.

Figure 5:
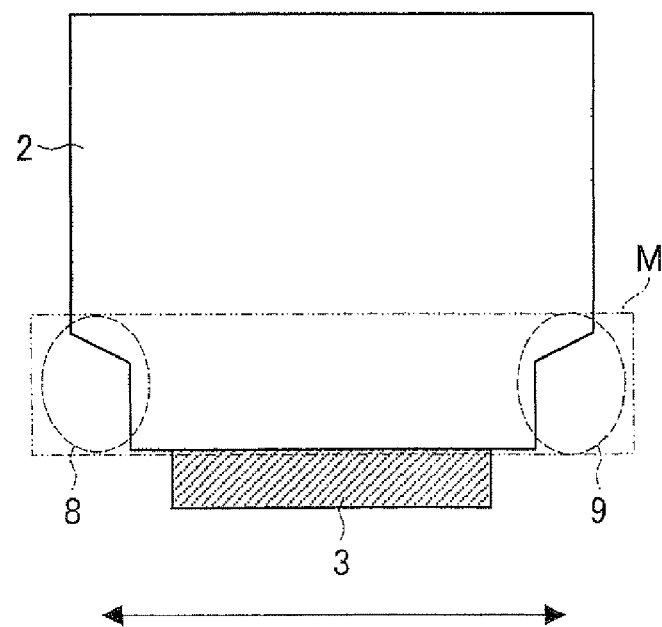
FIG. 5 is a plan view showing a configuration of a light guide element.

In the embodiment, as shown in FIG. 5, each light guide element 2 has holding sections 8, 9 recessed in the width direction (refer to the arrow in the figure) on its both sides of the thicker end M on which the other light guide element lies. More specifically, as shown in FIG. 6, the light guide element 2a has holding sections 8a, 9a recessed in the width direction on both sides of the thicker end, the light guide element 2b has holding sections 8b, 9b recessed in the width direction on both sides of the thicker end on which the light guide element 2a lies, the light guide element 2c has holding sections 8c, 9c recessed in the width direction on both sides of the thicker end on which the light guide element 2b lies, the light guide element 2d has holding sections 8d, 9d recessed in the width direction on both sides of the thicker end, the light guide element 2e has holding sections 8e, 9e recessed in the width direction on both sides of the thicker end on which the light guide element 2d lies, and the light guide element 2f has holding sections 8f, 9f recessed in the width direction on both sides of the thicker end on which the light guide element 2e lies.

Further, as shown in FIGS. 6 and 1, each light guide element 2a to 2f is positioned such that the holding sections 8a to 8c are fit with the rib 7A to 7C, the holding sections 9a and 8d are fit with the rib 7D, the holding sections 9b and 8e are fit with the rib 7E, the holding sections 9c and 8f are fit with the rib 7F, the holding sections 9e to 8f are fit with the rib 7G to 7I in the housing 4. Then, each light guide element 2a to 2f are thereby held in the housing 4 with ribs 7A to 7I. In the arrangement, positional displacement or a jouncing of each of light guide elements 2a to 2f can be prevented. The arrangement is effective especially in the width direction (refer to the arrow in FIGS. 1 and 6) of the light guide elements.

Here, the holding sections of each light guide element (the holding sections 8b, 9b of the light guide element 2b, the holding sections 8c, 9c of the light guide element 2c, the holding sections 8e, 9e of the light guide element 2e, and the holding sections 8f, 9f of the light guide element 2f) are sections on which the other light guide elements lie. Therefore, even though the sections have recesses, light emitting quantity of each light guide element (2b, 2c, 2e, 2f) is not affected thereby. From a viewpoint of light utilization efficiency, it is preferable that light is not absorbed by the ribs 7. Therefore, it is preferable that the ribs 7 are optical transparent or light reflective.

In the configuration in FIG. 1 (FIG. 5), the recesses of the holding sections 8, 9 reach the edge of a light guide element. On the other hand, for instance, as shown in FIG. 7(a)(b), recesses of holding sections 8, 9 may be in a shape of isosceles trapezoid which do not reach the edge of the light guide element 2. Hexagonal ribs 7 may be provided on a housing, and then the recesses and the ribs 7 may be fitted with each other. In the configuration, positional displacement or a jouncing can be prevented, not only in width direction of the light guide element (x direction in FIG. 7(b)) but also in tandem direction (y direction in FIG. 7(b)). Further, recesses of the holding section 8, 9 may be in the shape of rectangle which does not reach the edge of the light guide element, and ribs on the housing 4 may be in a shape which fits with the rectangle.

Figure 8:
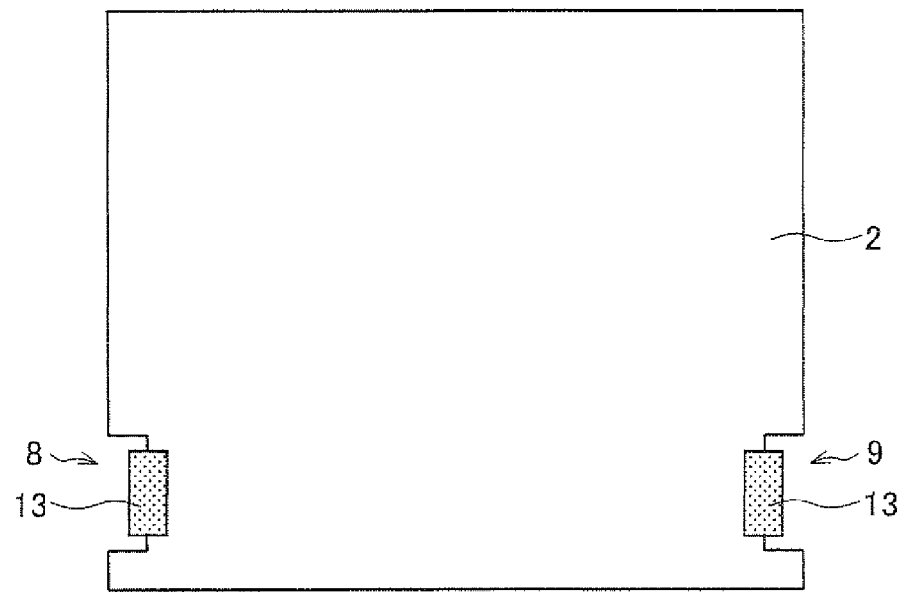
FIG. 8(a) is a plan view showing an example of a modification of a backlight device in the first embodiment.
FIG. 8(b) is a plan view showing another example of a modification of a backlight device in the first embodiment of the present invention.
Figure 8:
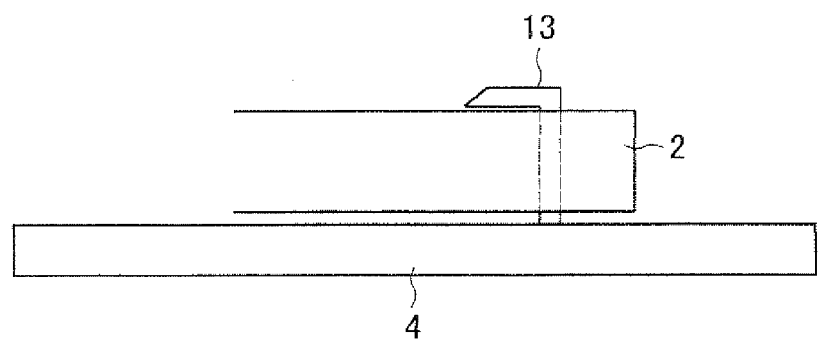

Further, in the configuration of FIG. 1, the ribs 7A to 7I are provided on the housing 4. Whereas, as shown in FIG. 8 (a)(b), holding hooks 13 may be provided on a housing 4, and holding sections (8, 9) of a light guide element 2 may be fitted with the holding hooks 13. In the configuration, positional displacement or a jouncing can be prevented in light emitting direction. In this ease also, from a viewpoint of light utilization efficiency, it is preferable that light is not absorbed by the holding hooks 13. Therefore, it is preferable that the holding hooks 13 are optical transparent or light reflective.

Figure 9:
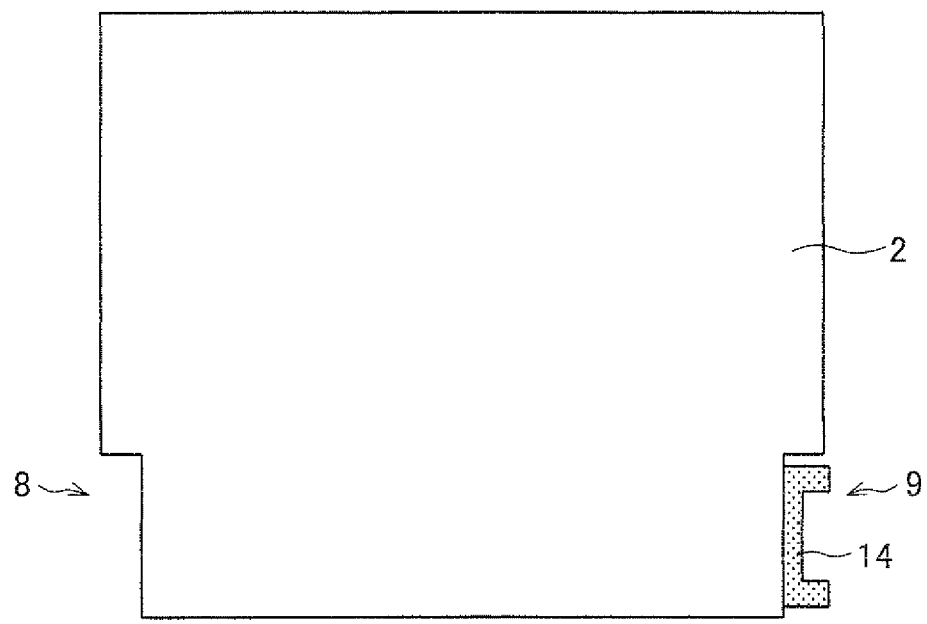
FIG. 9 is a plan view showing an example of a modification of a backlight device in the first embodiment.

It may happen that if a light guide element is modified significantly because of large or complicated recesses of holding sections 8, 9, light utilization efficiency may decrease. As shown in FIG. 9, small recesses (8, 9) in a light guide element 2 may be provided, and holding parts 14 which fit with shapes of ribs or holding hooks of a housing may be attached on the recesses.

Shapes of holding sections of a light guide element are not limited as long as the sections are recesses in width direction in a section (thicker end) on which the other light guide element lies. Moreover, number of recesses is also not limited. For instance, a plurality of holding sections may be provided on a side of a light guide element. Further, shapes, materials, and number of ribs 7 (or holding hooks 13) provided on a housing are not limited. For instance, ribs (or hooks) may fixedly hold (hold) both light guide elements which are adjacent in a direction perpendicular to tandem direction. Further, ribs 7 (or holding hooks 13) provided on a housing may be integrated with the housing, or may be attached on the housing by adhesive, screws, or the other means.

[Second Embodiment]

Figure 10:
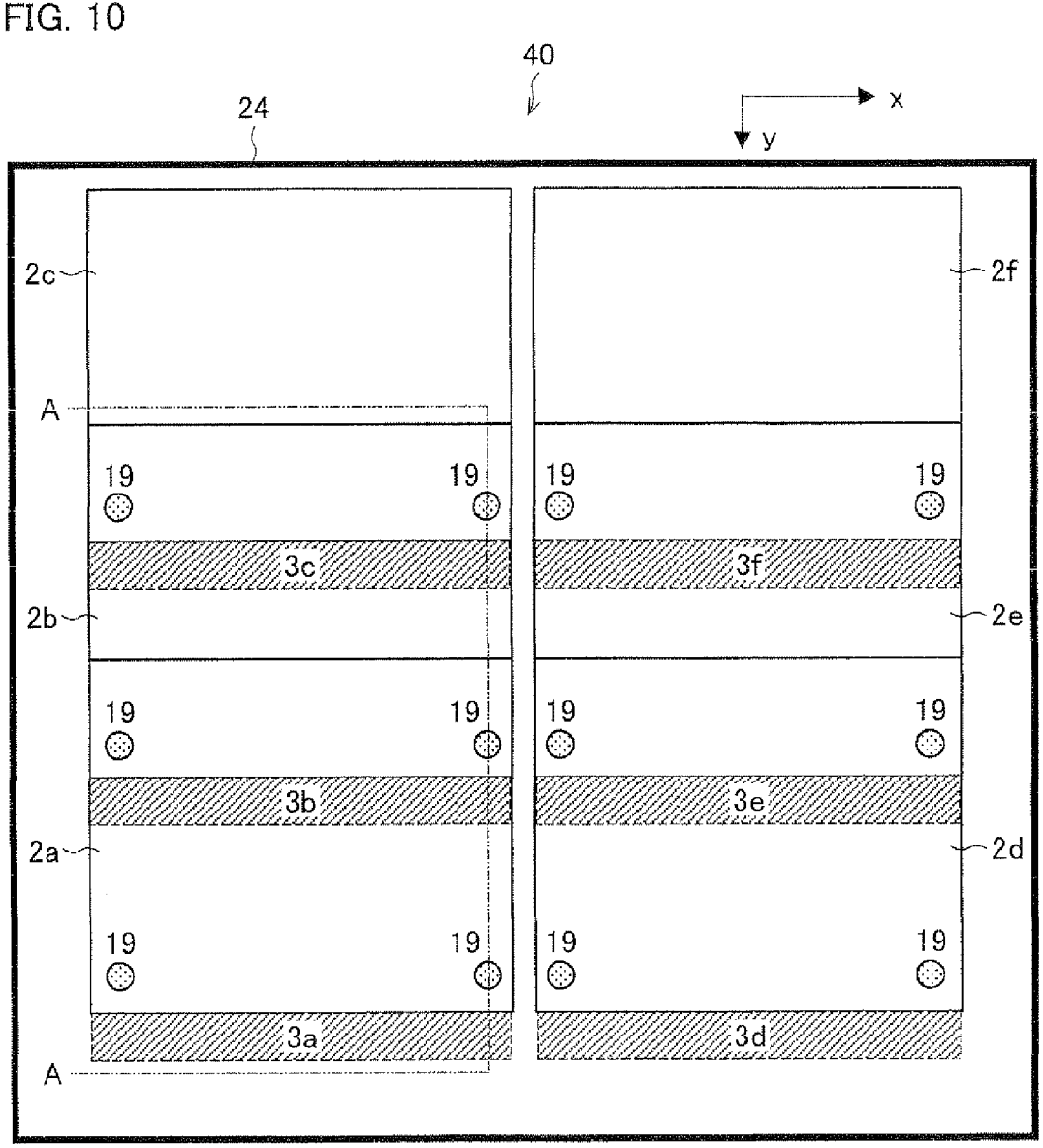
FIG. 10 is a plan view showing a configuration of a backlight device in a second embodiment.
Figure 11:
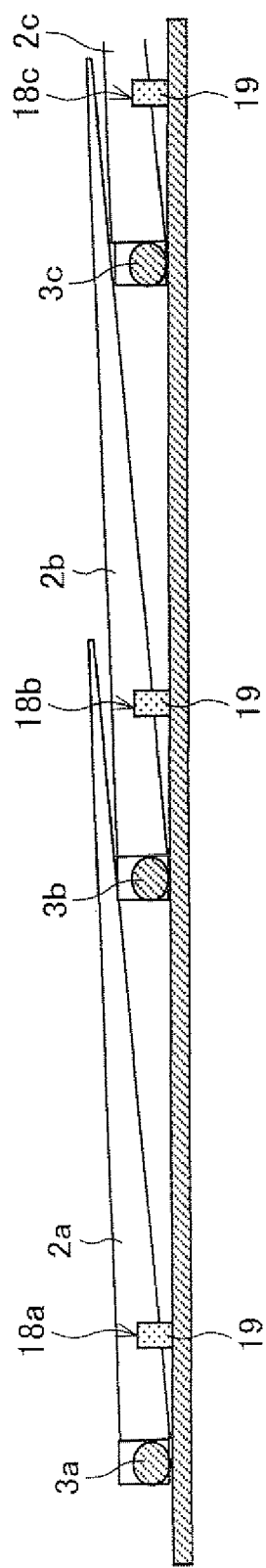
FIG. 11 is a cross-sectional view taken along line A-A of FIG. 10.
Figure 12:
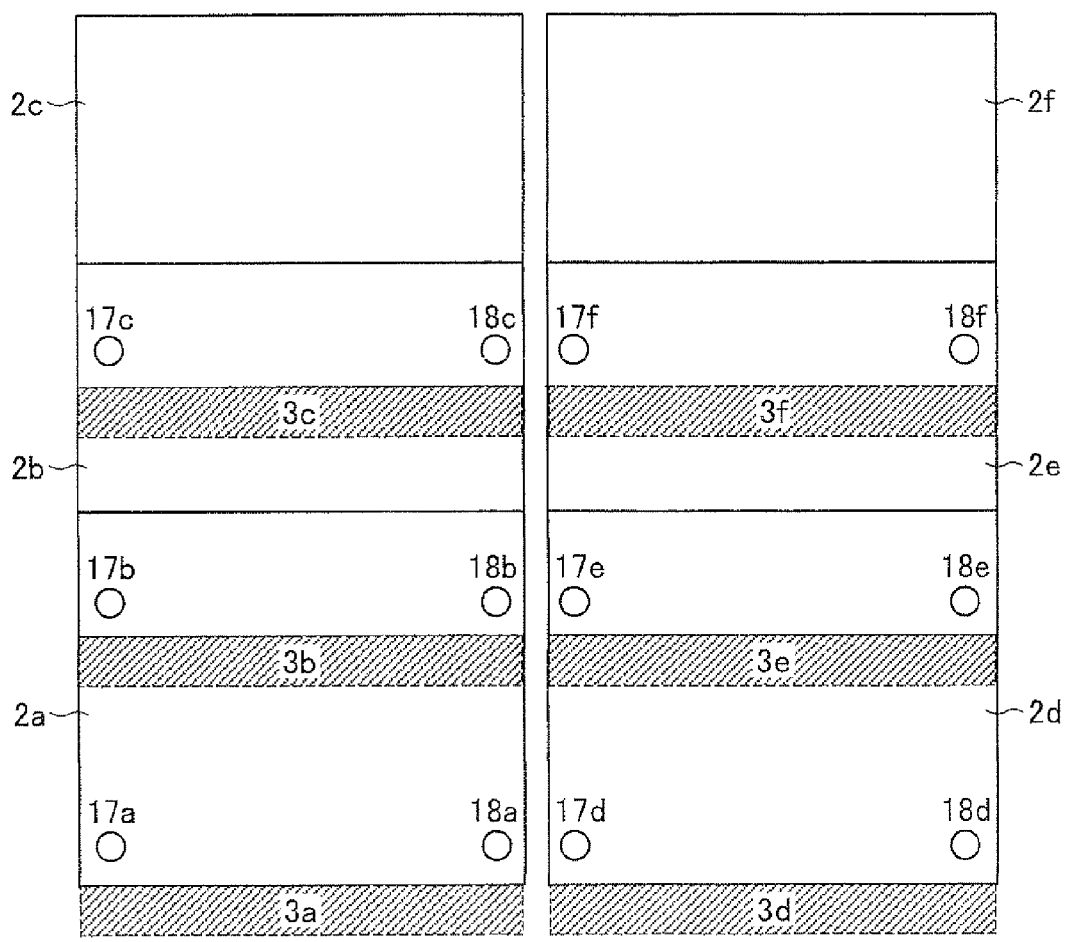
FIG. 12 is a plan view showing an arrangement of light guide elements and a light emitting elements in the second embodiment.

FIG. 10 is a plan view showing a configuration of a backlight device in the second embodiment. FIG. 11 is a cross-sectional view taken along line A-A of FIG. 10. FIG. 12 is a plan view showing an arrangement of light guide elements and light emitting elements in a present backlight device. As shown in FIG. 11, in the present embodiment, each light guide element 2 has two holding holes 17, 18 in a rear face of a thicker end on which the other light guide element lies. For instance, a light guide element 2a has holding holes 17a, 18a in a rear face of a thicker end, a light guide element 2b has holding holes 17b, 18b on both sides in a rear face of a thicker end on which the light guide element 2a lies, a light guide element 2c has holding holes 17c, 18c in a rear face of a thicker end on which the light guide element 2b lies, a light guide element 2d has holding holes 17d, 18d in a rear face of a thicker end, a light guide element 2e has holding holes 17e, 18e in a rear face of a thicker end on which the light guide element 2d lies, and a light guide element 2f has holding holes 17f, 18f on both sides in a rear face of a thicker end on which the light guide element 2e lies.

As shown in FIGS. 10 to 12, each of light guide elements 2a to 2f is positioned and fixed in a housing 24 having ribs 19 so that each of holding holes 17, 18 and the ribs 19 are fitted with each other. In the configuration, positional displacement or a jouncing can be prevented, not only in width direction of the light guide element (x direction in FIG. 7(b)) but also in tandem direction (y direction in FIG. 7(b)). Here, the holding holes of each light guide element (the holding holes 17b, 18b of the light guide element 2b, the holding holes 17c, 18c of the light guide element 2c, the holding holes 17e, 18e of the light guide element 2e, and the holding holes 17f, 18f of the light guide element 2f) are provided in sections on which the other light guide elements lie. Therefore, even though the sections have holes, light emitting quantity of each light guide element (2b, 2c, 2e, 2f) is not affected thereby.

Shapes of holding holes of a light guide element are not limited as long as the holes are provided in a rear face of a section (thicker end) on which the other light guide element lies. Moreover, the number of holes is also not limited. For instance, holes may not be penetrating having enough strength for fixedly holding a light guide element. On the other hand, holes may be penetrating. Moreover, a plurality of holding holes may be provided in rear face along a side of a light guide element. Further, shapes, materials, and number of ribs 19 provided on a housing 24 are not limited. Further, the ribs 19 may be substituted with holding hooks.

[Third Embodiment]

Figure 13:
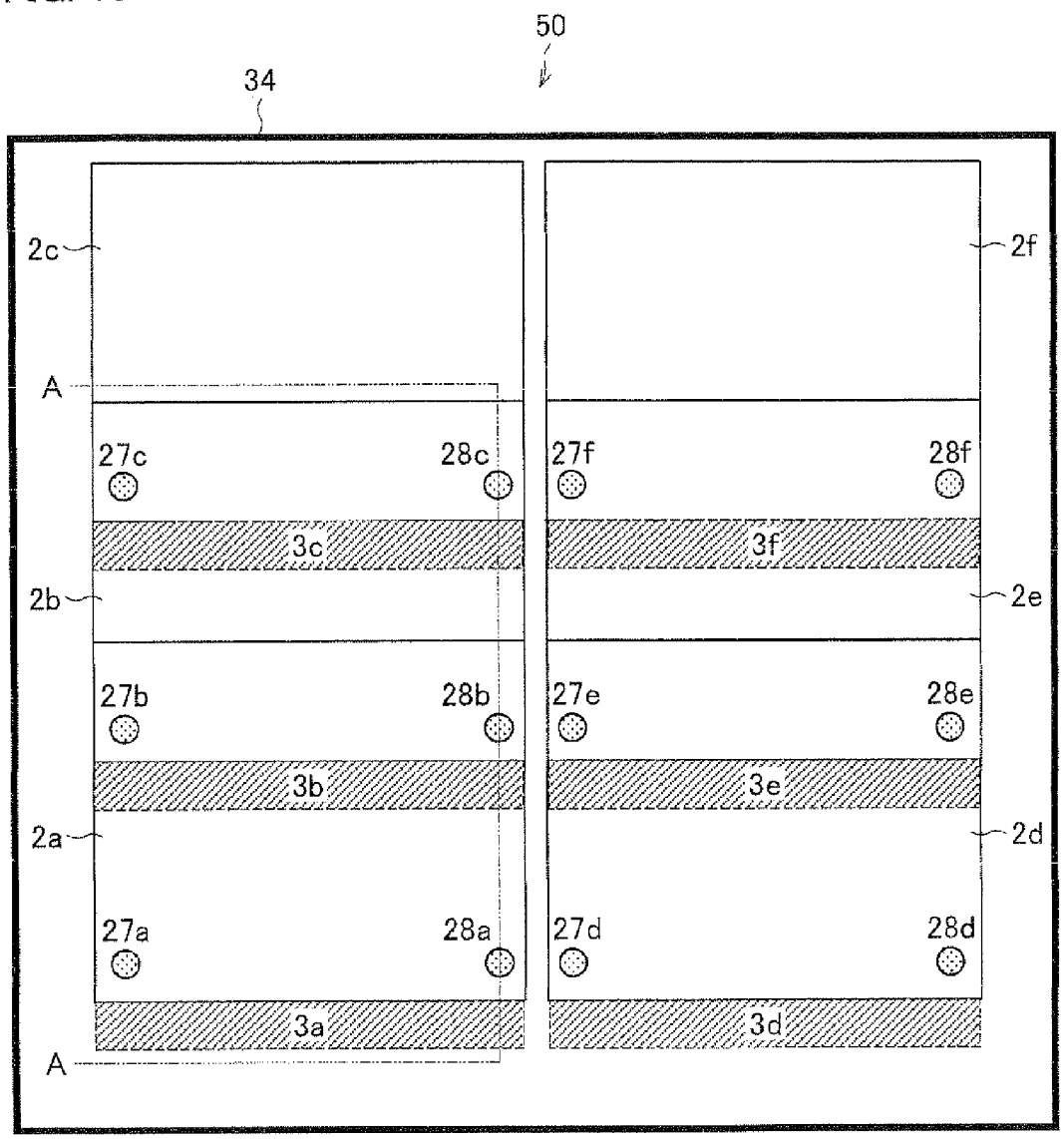
FIG. 13 is a plan view showing a configuration of a backlight device in a third embodiment.
Figure 14:
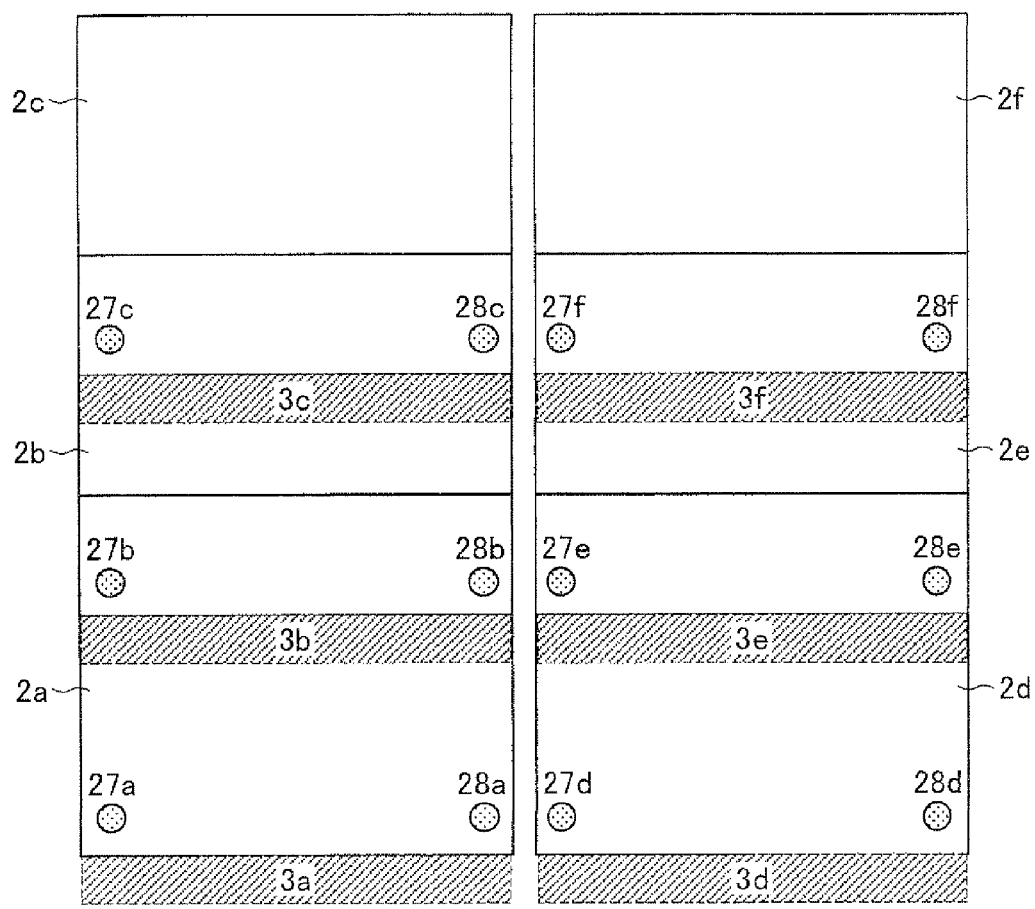
FIG. 14 is a plan view showing an arrangement of light guide elements and light emitting elements in the third embodiment.
Figure 15:
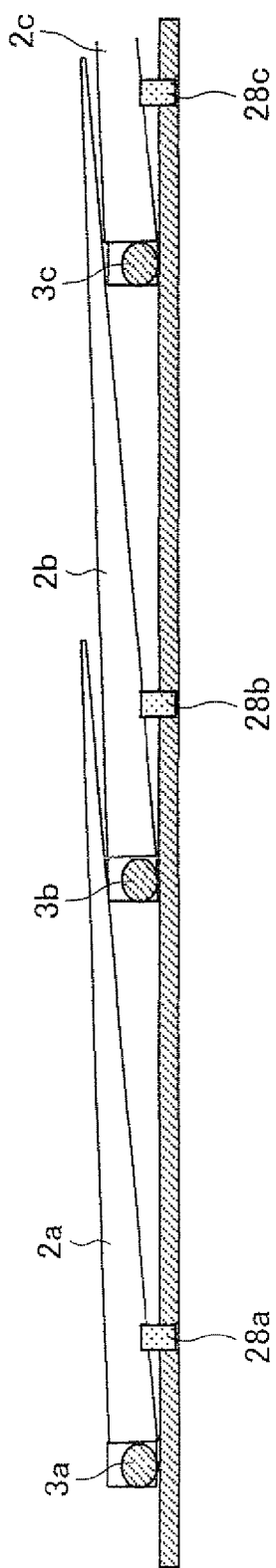
FIG. 15 is a cross-sectional view taken along line A-A of FIG. 13.

FIG. 13 is a plan view showing a configuration of a backlight device in the embodiment. FIG. 14 is a plan view showing an arrangement of light guide elements and light emitting elements in a present backlight device. FIG. 15 is a cross-sectional view taken along line A-A of FIG. 13. As shown in FIG. 14, in a present backlight device 50, each light guide element 2 has ribs 27 on a rear face of a thicker end on which the other light guide element lies. For instance, a light guide element 2a has ribs 27a, 28a on a rear face of a thicker end, a light guide element 2b has ribs 27b, 28b on both sides of a rear face of a thicker end on which the light guide element 2a lies, a light guide element 2c has ribs 27c, 28c on a rear face of a thicker end on which the light guide element 2b lies, a light guide element 2d has ribs 27d, 28d on a rear face of a thicker end, a light guide element 2e has ribs 27e, 28e on a rear face of a thicker end on which the light guide element 2d lies, and a light guide element 2f has ribs 27f, 28f in a rear face of a thicker end on which the light guide element 2e lies.

As shown in FIGS. 13 to 15, each of light guide elements 2a to 2f is positioned and fixed in a housing 34 with holding holes so that each holding hole and the ribs 27, 28 are fitted with each other. In the configuration, positional displacement or a jouncing can be prevented, not only in width direction of the light guide element (x direction in FIG. 7(b)) but also in tandem direction (y direction in FIG. 7(b)). Here, the ribs of each light guide element (the ribs 27b, 28b of the light guide element 2b, the ribs 27c, 28c of the light guide element 2c, the ribs 27e, 28e of the light guide element 2e, and the ribs 27f, 28f of the light guide element 2f) are provided on sections on which the other light guide elements lie. Therefore, even though the sections have holes, light emitting quantity of each light guide element (2b, 2c, 2e, 2f) is not affected thereby. From a viewpoint of utilization efficiency of light, it is preferable that the ribs 27, 28 are light reflective.

Shapes of ribs of a light guide element are not limited as long as the ribs are provided on a rear face of a section (thicker end) on which the other light guide element lies. Moreover, the number of ribs is also not limited. Further, the ribs 27, 28 may be substituted with holding hooks. Moreover, shapes of the holding holes of the housing 34 are not limited. The shapes may be in any shapes (for instance, circle or square) which fit with ribs.

[Fourth Embodiment]

Figure 16:
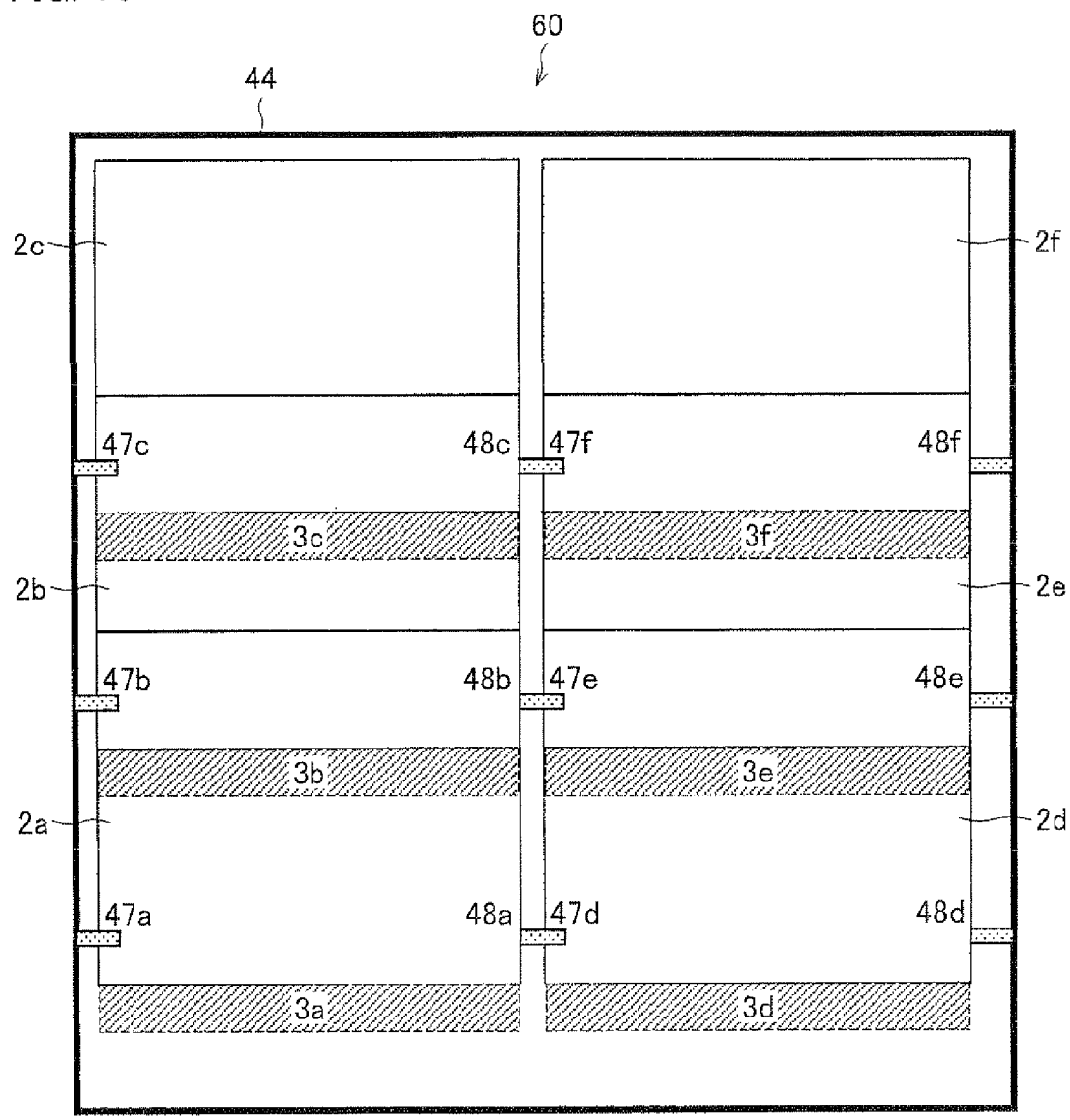
FIG. 16 is a plan view showing a configuration of a backlight device in a fourth embodiment.

FIG. 16 is a plan view showing a configuration of a backlight device in the embodiment. As shown in the figure, in a present backlight device 60, each light guide element 2 has a protrusion 48 on one side and a recess 47 in the other side of a thicker end on which the other light guide element lies. For instance, a light guide element 2a has a protrusion 48a in one side and a recess 47a on the other side of a thicker end. A light guide element 2b has a recess 47b in one side and a protrusion 48b on the other side of a thicker end on which the light guide element 2a lies, a light guide element 2c has a recess 47c on one side and a protrusion 48c on the other side of a thicker end on which the light guide element 2b lies, a light guide element 2d has a recess 47d in one side and a protrusion 48d on the other side of a thicker end, a light guide element 2e has a recess 47e on one side and a protrusion 48e on the other side of a thicker end on which the light guide element 2d lies, and a light guide element 2f has a recess 47f on one side and a protrusion 48f on the other side of a thicker end on which the light guide element 2e lies.

As shown in FIG. 16, each of light guide elements 2a to 2f is positioned and fixed in a housing 44 so that protrusions 48 and recesses 47 of each light guide element are fitted with each other. In the configuration, positional displacement or a jouncing can be prevented, not only in width direction of the light guide element (x direction in FIG. 7(b)) but also in tandem direction (y direction in FIG. 7(b)). Here, the protrusions and the recesses of each light guide element (the protrusions 48b and recesses 47b of the light guide element 2b, the protrusions 48c and recesses 47c of the light guide element 2c, the protrusions 48e and recesses 47e of the light guide element 2e, and the protrusions 48f and recesses 47f of the light guide element 2f) are provided on (in) sections on which the other light guide elements lie. Therefore, even though the sections have holes, light emitting quantity of each light guide element (2b, 2c, 2e, 2f) is not affected thereby. From a viewpoint of light utilization efficiency, it is preferable that the protrusions 48 are light reflective.

Figure 17:
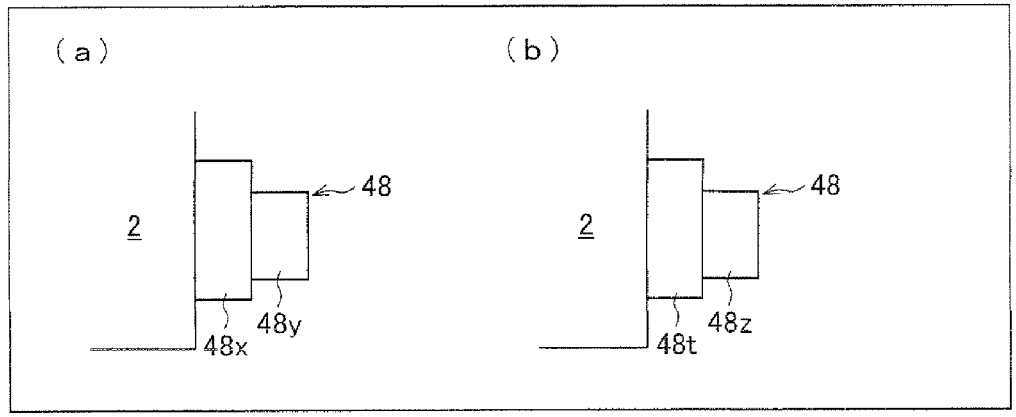
FIG. 17 is a side view showing examples of a modification of backlight devices in the fourth embodiment.
Figure 18:
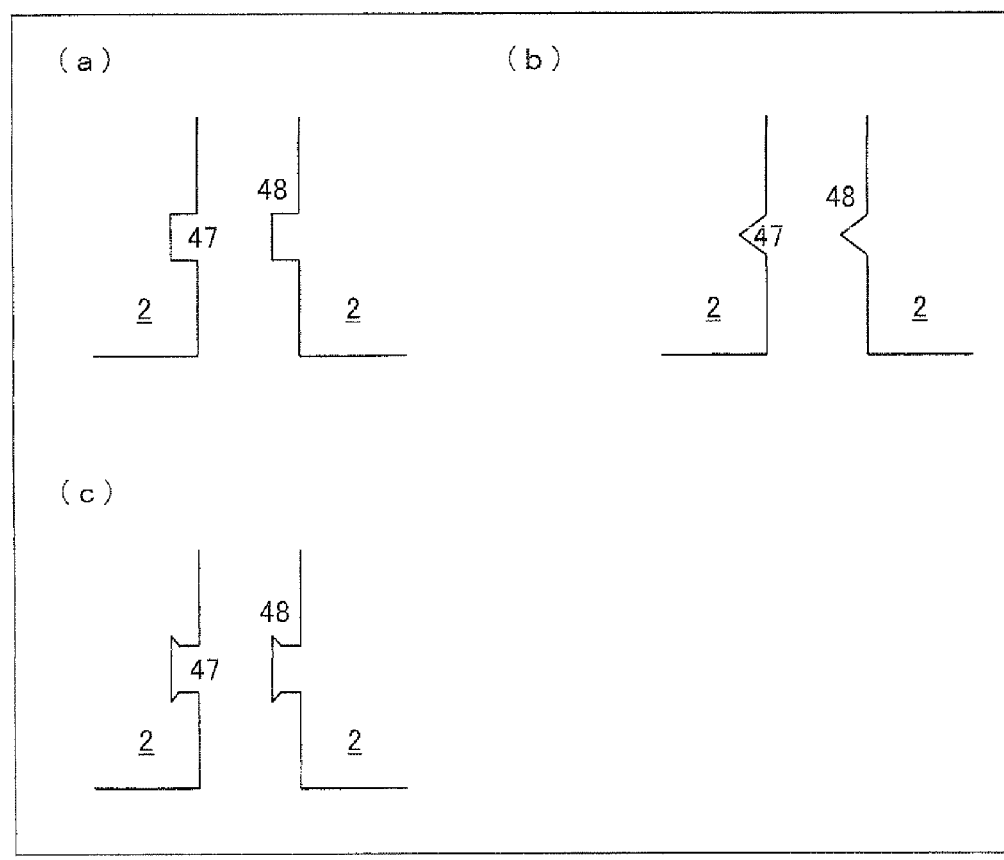
FIG. 18 is a side view showing other examples of a modification of backlight devices in the fourth embodiment.

Shapes of protrusions 48 are not limited as long as the protrusions are provided on a side of a section (thicker end) on which the other light guide element lies. Moreover, number of protrusions is also not limited. For instance, as shown in FIG. 17 (a), a protrusion 48 may have a shape of bolt (two-step protrusion) which includes a thicker pin 48x and a thinner pin 48y thereon. In this configuration, adjacent light guide elements can be fixed with intervals between each other. Further, as shown in FIG. 17 (b), a protrusion 48 may have a shape of bolt which includes a pin 48z covered by a washer 48t on its bottom part. Moreover, as shown in FIG. 18 (a) to (c), protrusions 48 of a light guide element 2 may have a shape of a rectangle, a roof, or a mushroom, and recesses 47 may have shapes which fit with the shapes of protrusions 48.

Figure 19:
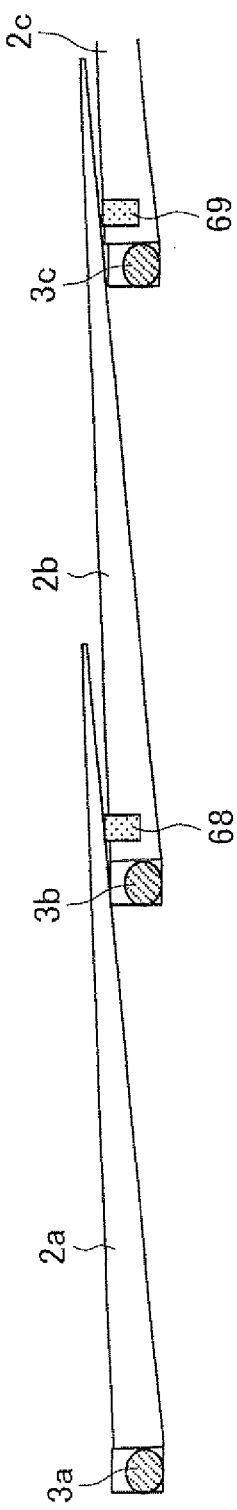
FIG. 19 is a cross-sectional view showing an example of configuration for fixedly holding light guide elements tandem arranged in each of the embodiments.
Figure 20:
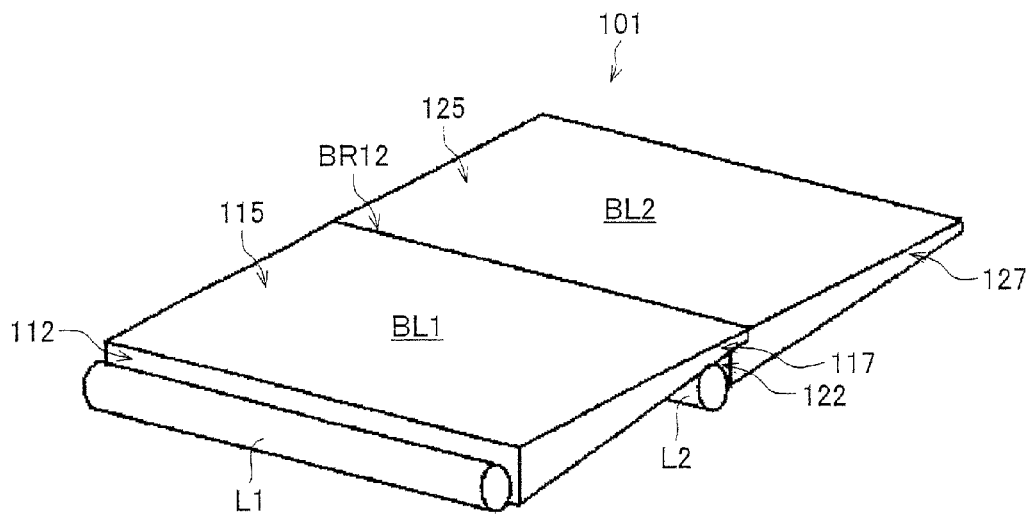
FIG. 20 is a perspective view showing an arrangement of light guide blocks and light emitting elements in a conventional backlight device.
Figure 21:
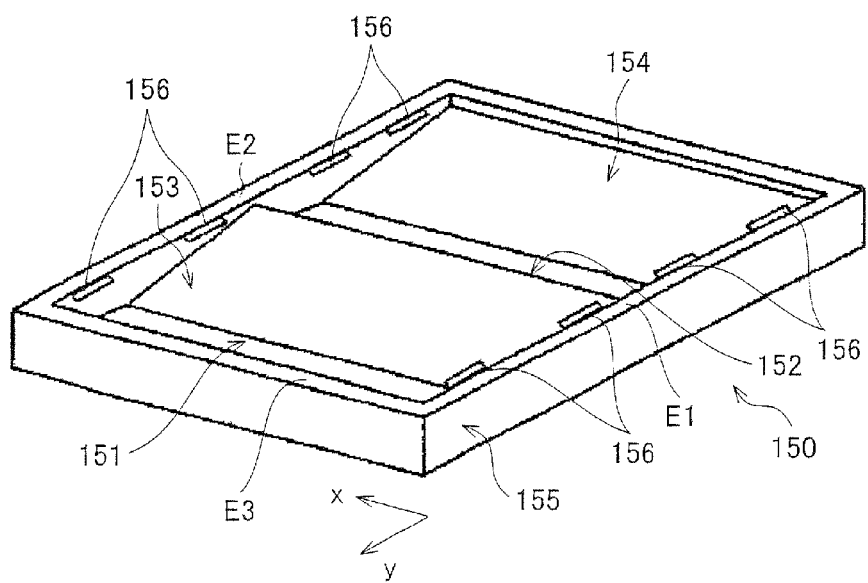
FIG. 21 is a perspective view showing an overall configuration of a conventional backlight device.
Figure 22:
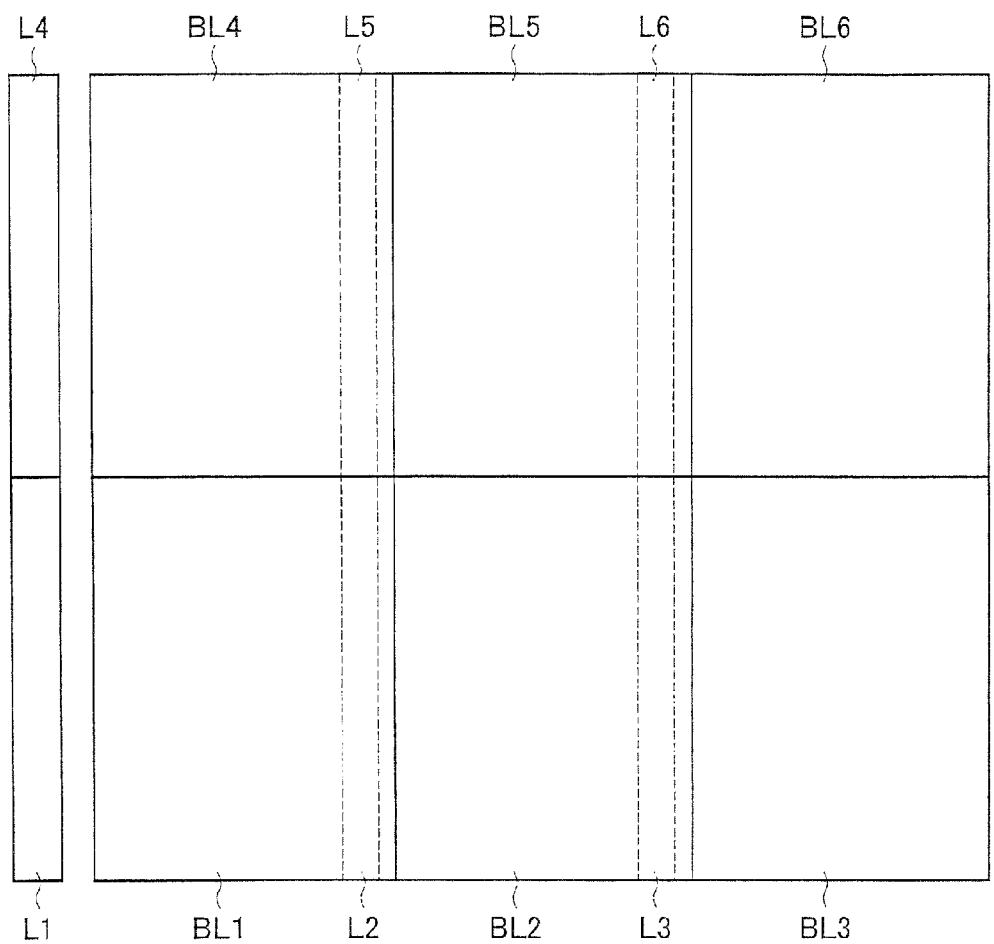
FIG. 22 is a plan view showing an example of a modification of a conventional backlight.

In each of the embodiments, as shown in FIG. 19, each light guide element 2 (for instance, light guide element 2b) may have connecting holes 68 in a front face of a thicker end on which the other light guide element lies, and also have connecting ribs 69 on a surface of a thinner end. In the configuration, light guide elements which are adjacent each other in tandem direction (y direction in FIG. 7(b)) are connected (fixed), and thereby positional displacement or a jouncing in y direction can be prevented. Shapes and number of connecting holes 68 and connecting ribs 69 are not limited.

Moreover, in each of the embodiments, a housing may hold each light guide element (a housing may have a shape along rear faces and side faces of light guide elements). Further, for instance, a light emitting element 3 may be comprised of any of CCFL (cold cathode fluorescent lamp), HCFL (hot cathode fluorescent lamp), or LED (light-emitting diode).

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

A light source device of the present invention is suitable for use in a liquid crystal display device etc.

The invention claimed is:

1. A light source device comprising:
first and second light guide elements; and
first and second light emitting elements for supplying light to the first and second light guide elements respectively;

wherein:
the first and second light guide elements each has a wedge-like shape whose thickness is reduced from one end to the other end;
the first and second light guide elements are tandem arranged such that the thinner end of the second light guide element lies over the thicker end of the first light guide element; and
the first light guide element has holding sections recessed in a width direction in its thicker end on which the second light guide element lies;
the thinner end of the second light guide element extends over and beyond the holding sections of the first light guide element; and
a housing that contains the first and second light emitting elements and the first and second light guide elements, the housing having protrusions fitted with the holding sections.

2. The light source device according to claim 1, wherein the protrusions are optical transparent or light reflective.

3. The light source device according to claim 1, wherein the protrusions are ribs that abut a side face of the thicker end.

4. The light source device according to claim 1, wherein the protrusions are hooks that abut a front face and a side face of the thicker end.

5. The light source device according to claim 1, wherein the light guide elements which are tandem arranged are aligned in plural lines.

6. The light source device according to claim 1, wherein the first and second light guide elements each has a connecting hole in its front face of the thicker end on which the other light guide element lies.

7. The light source device according to claim 6, wherein the light guide elements each has a connecting rib on its rear face of the thinner end which lies on the other light guide element, the connecting rib being fitted with one of the connecting holes.

8. A backlight device including:
a light source device according to claim 1.

9. A liquid crystal display device including:
a backlight device according to claim 8.

* * * * *